(12) United States Patent
Leetaru et al.

(10) Patent No.: US 7,650,335 B2
(45) Date of Patent: Jan. 19, 2010

(54) HIGH-LEVEL DATABASE MANAGEMENT SYSTEM

(75) Inventors: Kalev Leetaru, Urbana, IL (US); Alan Craig, Peoria, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 73 days.

(21) Appl. No.: 11/407,685

(22) Filed: Apr. 20, 2006

(65) Prior Publication Data

US 2006/0242189 A1 Oct. 26, 2006

Related U.S. Application Data

(60) Provisional application No. 60/673,422, filed on Apr. 20, 2005.

(51) Int. Cl.
*G06F 17/00* (2006.01)

(52) U.S. Cl. .................... 707/5; 707/100; 707/101; 707/104.1; 707/102

(58) Field of Classification Search .................. 707/5, 707/100–102, 104.1
See application file for complete search history.

(56) References Cited

U.S. PATENT DOCUMENTS

2004/0230605 A1 11/2004 Tamboli et al.
2006/0200462 A1* 9/2006 Kadayam et al. ............. 707/5

* cited by examiner

*Primary Examiner*—Sana Al-Hashemi
(74) *Attorney, Agent, or Firm*—Perkins Coie LLP (57) ABSTRACT

A method and system for allowing end users to create a database and a user interface to interact with database data are provided. The database management system provides a database abstraction layer that hides the complexities of a database and vendor-specific implementation details from the end user, while still allowing the end user to perform powerful database tasks. The database management system allows an end user with little or no knowledge about databases to create, edit, and maintain a database without understanding the details behind the database. The database management system also provides a facility for the easy creation of web pages to access the database to provide features such as searching, data entry, and browsing data stored in the database.

29 Claims, 8 Drawing Sheets

TABLEINFO (400)

| Owner Database ID | Table ID | Real Name | Human Name | Field List | ACLs |
|---|---|---|---|---|---|
| 1 | 1 | table 001 | My friends | ... | ... |
| (405) | (410) | (415) | (420) | (425) | (430) |

*FIG. 4A*

DATATYPEPLUGININFO (435)

| Plugin ID | Real Name | Human Name | Write Function | Real Func Ptr | HTML GUI Ptr |
|---|---|---|---|---|---|
| 1 | BLOB | Image | ... | ... | ... |
| (440) | (445) | (450) | (455) | (460) | (465) |

*FIG. 4B*

USERINFO (470)

| User Name | Password | Full Name | Email Address | Security ACLs |
|---|---|---|---|---|
| jdoe | enigma | John Doe | | |
| (475) | (480) | (485) | (490) | (495) |

…
HIGH-LEVEL DATABASE MANAGEMENT SYSTEM

CROSS-REFERENCE TO RELATED APPLICATIONS

The present application claims priority to provisional U.S. Patent Application No. 60/673,422 Apr. 20, 2005, entitled "ONLINE HIGH-LEVEL WEB DATABASE CREATION/MANAGEMENT SYSTEM," which is hereby incorporated by reference.

BACKGROUND

Databases are used in a variety of different computer systems today for a vast number of purposes. For example, databases can be used to manage contact information such as first names, last names, and phone numbers. Databases are also used on a variety of scales. For example, a database can be used by an individual user to store that user's list of friends and relatives, or by a corporation to store employee, customer, or financial information. Databases are also used for electronic commerce to store item descriptions and the state of transactions with customers, and to manage inventory.

Despite the widespread use of databases, the creation and maintenance of databases has remained a task for specialized engineers and designers. For instance, to create a table in a database a specialized person needs to know the data types provided by the database for database fields, any limitations on the length of data that can be stored for each data type, the precision available for numeric data types, and whether a particular data type is indexable, just to name a few examples. Moreover, since the features and requirements of databases delivered by different vendors vary substantially, a specialized person typically specializes in the database products of only one vendor. Some database products, for example, have strict requirements for field names, such as that field names be limited to 30 characters in length, start with a letter, and only contain letters and numbers without spaces or other symbols. Some database products support data types that others do not, and some allow operations that others do not, such as renaming fields or tables after they are created.

The differences in database implementations and the inherent complexities in databases increase the difficulty of working with databases and restrict the number of users qualified to create and maintain databases. This prevents a large number of users from being able to benefit from the power of databases to store and organize their information for a variety of purposes.

Another problem with traditional databases is the difficulty of creating user interfaces to interact with database data. Providing meaningful interaction with a database to end users generally requires the creation of a custom client application using one of several database communication protocols. These protocols vary based on the database vendor and require programming skills to create an application to use them. More recent databases have allowed access from the web using a standard web browser, but they still require the skills of a web developer to create web pages that pull information from the database and format it for display in the browser. The creation of a database and a user interface to access it often requires a skilled team of specialized programmers and operations personnel. Since many organizations do not have such a skilled team, many opportunities for use of such a database to improve the efficiency of the organization are not realized.

SUMMARY

A method and system for allowing end users to create a database and a user interface to interact with database data are provided. The database management system provides a database abstraction layer that hides the complexities of a database and vendor-specific implementation details from the end user, while still allowing the end user to perform powerful database tasks. The database management system works on many different underlying database architectures and presents similar features to the end user regardless of the underlying system. The database management system allows an end user with little or no knowledge about databases to create, edit, and maintain a database without understanding the details behind the database. The database management system also provides a facility for the easy creation of web pages to access the database to provide features such as searching, data entry, and browsing data stored in the database. The database management system delivers these capabilities through a database abstraction layer back-end and a web access layer front-end. The database abstraction layer operates between the user and an underlying database system. The web access layer allows easy collaboration and sharing of data by making database data easily accessible from a web browser.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system for allowing end users to create a database and a user interface to interact with database data are provided. The database management system provides a database abstraction layer that hides the complexities of a database and vendor-specific implementation details from the end user, while still allowing the end user to perform powerful database tasks. For example, an end user can specify user-friendly data types such as "text" or "number with decimal point" without worrying about length limitations or numeric precision requirements of the underlying database. The database management system works on many different underlying database architectures and presents similar features to the end user regardless of the underlying system. The database management system allows an end user with little or no knowledge about databases to create, edit, and maintain a database without understanding the details behind the database. The database management system also provides a facility for the easy creation of web pages to access the database to provide features such as searching, data entry, and browsing data stored in the database. The database management system delivers these capabilities through a database abstraction layer back-end and a web access layer front-end, described in further detail below. The database abstraction layer operates between the user and an underlying database system. The web access layer allows easy collaboration and sharing of data by making database data easily accessible from a web browser.

Database Abstraction Layer

In some embodiments, the database management system allows the creation of database fields that do not have limitations of native field types of the underlying database. For example, while the underlying database may have a native naming syntax that limits field names to 30 characters, the database management system allows fields with names longer than 30 characters. Likewise, the database management system supports field names that have spaces regardless of whether the underlying database provides similar support. The database management system does this by creating fields with an actual field name that is generic, such as "FieldX" where X is a number that increments each time a field is created, and creating a table that stores a mapping of actual field names to user-defined field names. When a user accesses a field, the database management system translates between the actual field name and the user-defined field name so that the user only interacts with the database using the user-defined field name.

In some embodiments, the database management system allows renaming fields without rebuilding the database. Some database systems do not support renaming database fields without creating specialized code, for example using Structured Query Language (SQL), that creates a field with the new name and moves data in the field with the old name to the new field before deleting the old field. However, the database management system allows renaming fields after they are created because the field names seen by a user are not the actual field names, as described above. Rather, the user interacts with a user-defined name for the field that is allowed to change at any time without impacting the underlying data.

In some embodiments, the database management system automatically chooses the native type to use for a user-defined field. For example, a user may indicate that a field contains a number but may not know the ultimate maximum value that may be placed in the field or the precision needed. The database management system automatically chooses an appropriate native data type to store the data. The database management system may automatically change the native data type used to store the field as data is added if the initially selected data type becomes no longer appropriate for the data. Other factors may also influence the choice of data type, such as whether the user intends to perform searches based on a particular field.

In some embodiments, the database management system automatically chooses which fields to index. For example, if the user creates a database of contacts and intends to search on a field called "Last Name" that contains each contact's last name, the database management system may create an index on the "Last Name" field. The database management system hides such details from the user and may ask simple questions, such as what is the expected number of entries when a new table is created or whether the user expects to perform searches when a new field is created.

In some embodiments, the database management system requests information from the user when the underlying database imposes a limitation. For example, some databases can only create indexes on fields shorter than a certain length. If the user indicates an intention to put longer data in a field and to perform searches on that field, the database management system may inform the user that the field length must be limited to produce faster searches. Alternatively, the database management system may partially index the field up to the allowed length if the underlying database supports partial indexing. The database management system may also decide not to index the field and inform the user that searches based on the field will take longer to complete.

In some embodiments, the database management system controls which users may access the database. For example, one user may be allowed to enter new information while another user is only allowed to view information. As an example, a company's list of employees may be visible to the public on the Internet so that customers can send emails to them, but those customers cannot add or update information in the employee list. Conversely, an employee in the human resources department of the company could be granted access to add, update, and remove employees from the list. User access may be controlled through a variety of common methods such as by issuing each user a username and password, using IP-based authentication, or issuing a cryptographic certificate to each user.

In some embodiments, the database management system supports fields that are specific to a particular user of the system. For example, a corporation may have a central database of customers that contains common fields for everyone to use as well as custom fields added by certain users. For example, the company customer database may contain fields for all users to browse containing each customer's last name, first name, and telephone number, but a user of the system may want to add some additional information for their own use such as the customer's birthday or spouse's name. The database management system allows each user to add fields to the database that are only visible by that user. The database management system may also allow an administrator of the system to decide which users can add fields to the database based upon the access control information specified.

In some embodiments, the database management system creates new databases from templates. A template specifies an example table and field layout for the database and preconfigures database settings in a way defined by the template author. An administrator can require the use of templates for creating databases by specifying appropriate access control information. For example, a corporation may allow each employee to maintain their own contacts database but may want each contacts database to contain similar fields. The company can distribute a contacts database template and restrict the database management system to only creating databases based upon the template. This way, the company can allow many separate databases but ensure that the format of each database is similar, such as for ease of importing the separate databases into a central database.

In some embodiments, the database management system allows searches that span multiple tables. Traditional database systems require an in-depth understanding of the complex relationships between tables to create queries that search for information in multiple tables. The database management system makes searching multiple tables easy by automatically determining how tables are related. For example, if one table contains names and home addresses, and another table contains names and work addresses, the database management system can determine that the two tables are related and allow a user to search for a particular name and receive both the home and work addresses of the identified person. The database management system may identify related tables by determining which tables have fields with similar names, which fields contain similar data, or a combination of the two.

In some embodiments, the database abstraction layer translates a user's commands into corresponding SQL statements for delivery to the underlying database. For example, joins and variable referencing are two SQL concepts often required for SQL queries that search multiple tables. If a user defines a search that spans multiple tables, the database management system produces the appropriate SQL statements to perform a join of the table data and introduces variable references needed to carry out the search. In the example given above where one table contains names and home addresses and another table contains names and work addresses, a common SQL query to access both would be: SELECT x1.Name, x1.Address, x2.Address FROM hometable x1, worktable x2 WHERE x1.Name LIKE '%SEARCHINPUT%' AND x1.Name=x2.Name. The temporary table identifiers x1 and x2 are referred to as variable referencing, and clarify for the database which table is being referred to at each point in the statement. This is an example of the type of syntax that a typical user would not be able to produce and that the database management system generates automatically.

In some embodiments, the database management system supports plug-in modules that enhance the system's data storage capabilities. For example, typical database systems do not support a field type that contains a bitmap image, but do support a generic binary blob field type. The database management system supports plug-ins that add support for new data types to the system. In the case of an image data type, the plug-in handles writing the image data to a field type that the database does support, such as the generic binary blob field type, as well as reading the image data from the native type and converting it back to image data. The plug-in may also store supplemental information needed by the new field type in the native field, such as the Multipurpose Internet Mail Extensions (MIME) type for image data useful for properly displaying the image on a web page.

In some embodiments, the database management system supports plug-in modules that enhance the system's data processing capabilities. For example, a plug-in may add a new type of search that allows the database management system to return which words occur most frequently in a given field or to return all sounds having a high-pitched voice provided by an audio data storage plug-in. As another example, a plug-in could produce an image of where an address contained in a field is located on a map of the area. The database management system communicates information from the database to the plug-in needed to support the enhanced data processing capability, and receives output from the plug-in for display to the user.

In some embodiments, the database management system provides a high-level application programming interface (API) that allows programs written by users to benefit from the easy-to-use database model provided by the system. Even though the system provides tremendous benefits to end users who are now able to utilize databases for a variety of tasks once limited to those with programming skill, the system is also useful for developers who want a high-level database paradigm that is independent of the underlying database used and that hides unnecessary database details from the application developer. Therefore, the database management system provides an API that developers can use to access the database using user-defined names for fields, plug-ins, access control, and the other features described above to achieve benefits similar to those achieved by an end user accessing the database through the web access or other interface layer.

Web Access Layer

In some embodiments, the database management system provides a web access layer through which the database can be managed and accessed. The database creator uses the web access layer to add, update, and delete tables and fields within tables to the database. The database creator can also use the web access layer to create a set of web pages for other users to access the database in a well-defined manner. Web pages can be created using a simple wizard-like interface that provides a friendly interface without knowledge of underlying database concepts.

In some embodiments, the database creator specifies the purpose of each page and the fields to be displayed, and the database management system automatically creates an appropriate web page. For example, a user can build a contact search page to access a contacts database by specifying the purpose of the page as searching and dragging the fields to search and the fields to display upon completion of the search onto the page. The database management system uses this information to create the web page. The web page may use several methods to carry out the user's request. For example, the API provided by the database management system may be used to retrieve the information, or the web access layer may create a web page that forms an appropriate SQL query to the underlying database. When the page creation is complete, the user may be given a Uniform Resource Locator (URL) to the new page (e.g., http://myserver.com/cgi-bin/databasedesignerpage?id=100) that can be given to other users, or the page may be placed in a hierarchy of pages available from a central web site. The database management system can create pages for many common purposes including browsing, editing, searching, and data entry.

In some embodiments, the database management system allows pages to be edited after they are created. For example, the web access layer may produce a simple page that can be edited in an HTML editor to add backgrounds and other graphics that enhance the appearance of the page. The user may also want to move fields around on the page or perform other minor modifications supported within the web access layer itself. An administrator of the system may also define which users have access to create and edit web pages based on specified access control information.

Figures

Figure 1:
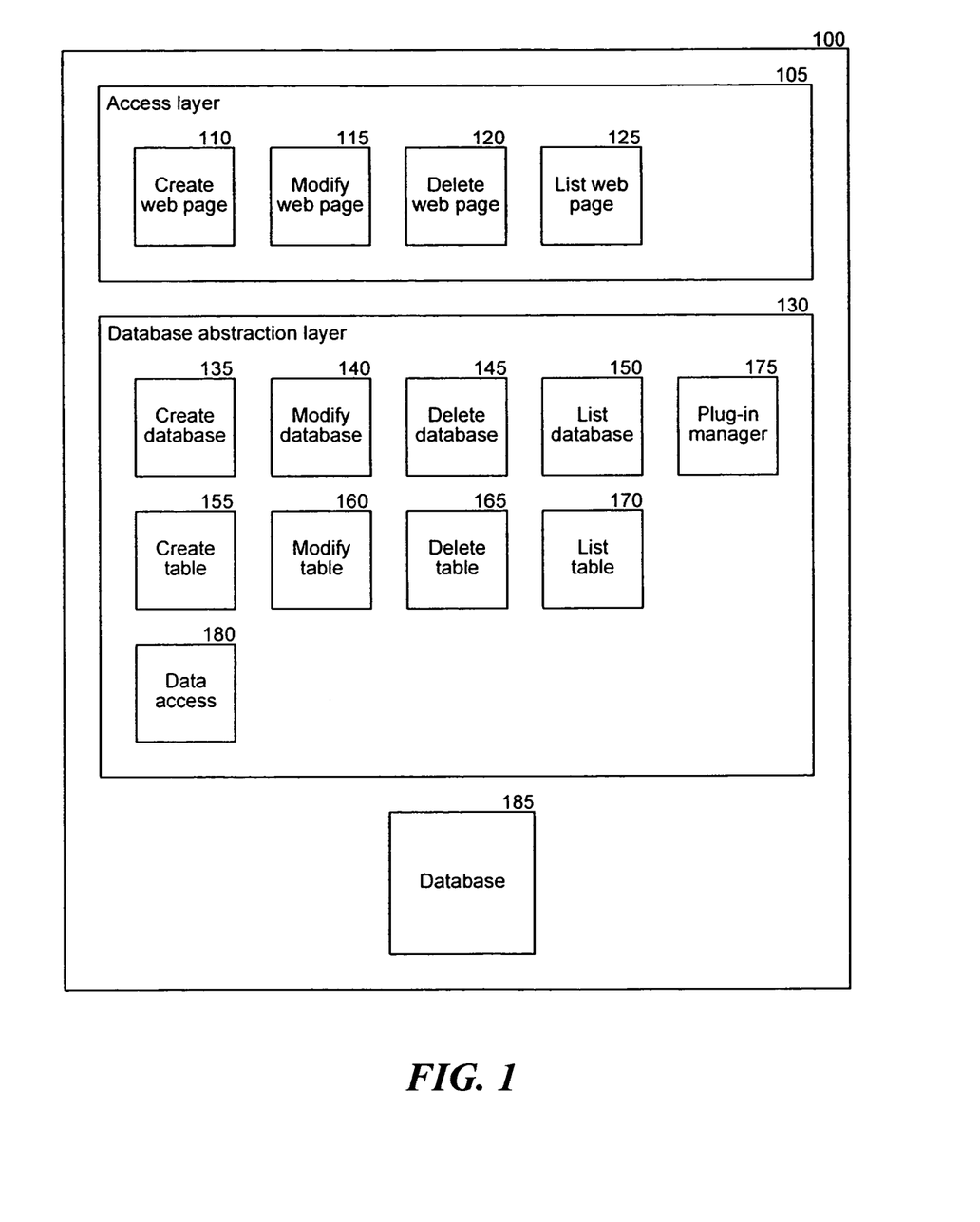
FIG. 1 is a block diagram that illustrates components of the system in one embodiment.

FIG. 1 is a block diagram that illustrates components of the system in one embodiment. The database management system 100 contains a database 185, a database abstraction layer 130, and an access layer 105. The access layer 105 contains a create web page component 110, a modify web page component 115, a delete web page component 120, and a list web page component 125. The create web page component 110 provides an easy wizard-like interface for creating web pages based on a database for purposes such as browsing, searching, or editing data in the database. The modify web page component 115 allows a user to modify a web page that has already been created, such as by adding and removing fields displayed by the web page or adding and removing access permission of various users. The delete web page component 120 removes a previously created web page. The list web page component 125 provides a list of created web pages to the database creator and provides web pages for display to the database users. The database abstraction layer 130 contains a create database component 135, a modify database component 140, a delete database component 145, a list database component 150, a create table component 155, a modify table component 160, a delete table component 165, a list table component 170, a plug-in manager component 175, and a data access component 180. The create database component 135 gathers information from a user and creates a database matching the user's specifications. The modify database component 140 allows a user to modify a database once it has been created, such as by adding new users to the database access list. The delete database component 145 removes a database from the system. The list database component 150 lists the databases created and can filter output to databases created by a specific user. The create table component 155 creates new tables based upon user specifications including the list of fields belonging to a table. The modify table component 160 modifies a table such as by changing user access or by adding and removing fields from the table. The delete table component 165 deletes a table from a database. The list table component 170 lists the tables in a particular database. The plug-in manager component 175 manages plug-ins by loading, unloading, and invoking plug-ins as needed. The data access component 180 provides access to data in tables and allows browsing, searching, and modifying data. The database component 185 can be any database that provides common data storage and retrieval functions.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
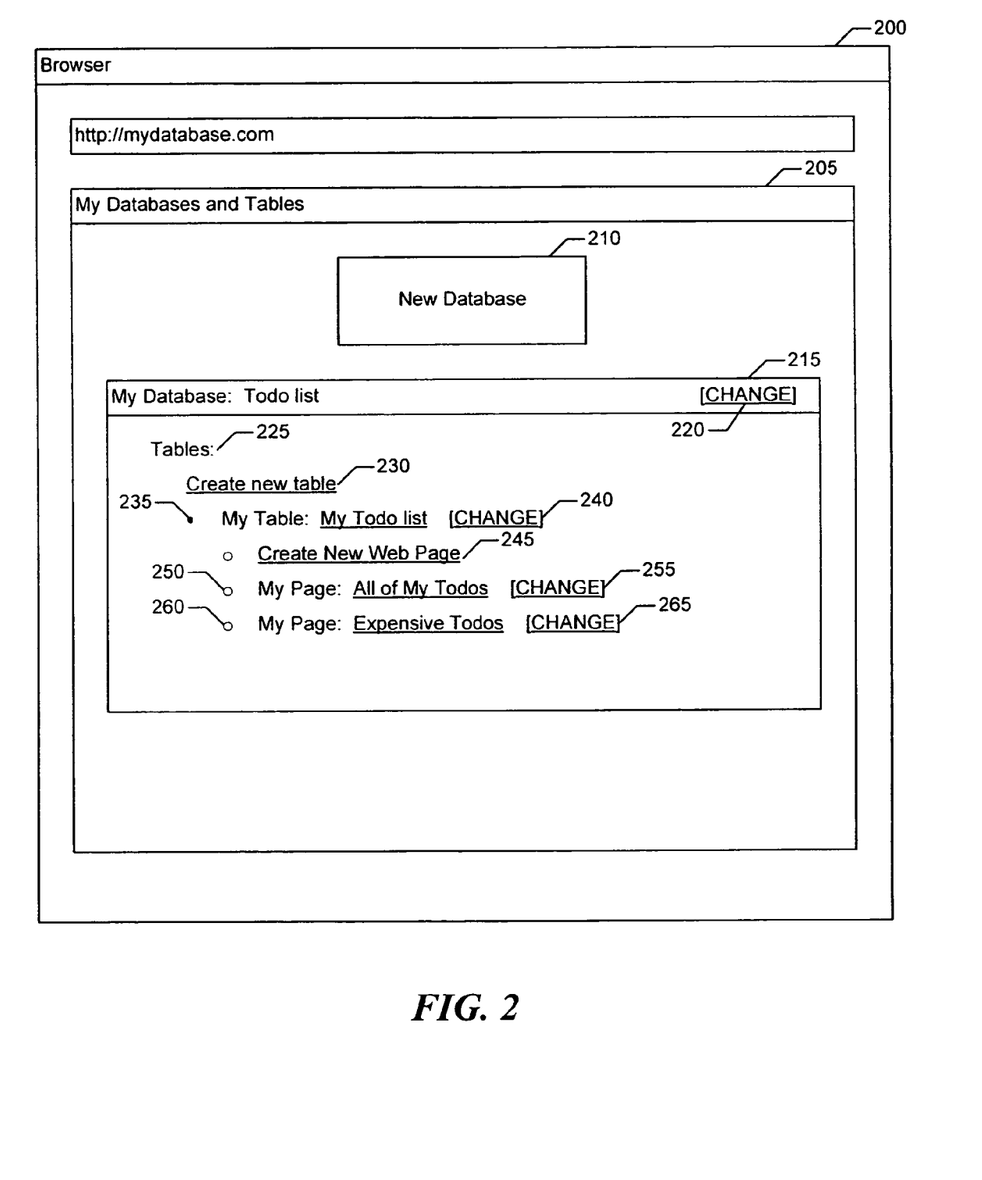
FIG. 2 illustrates a display page of the user interface of the system in one embodiment.

FIG. 2 illustrates a display page of the user interface of the system in one embodiment. The illustration shows an example of a user-friendly interface, available to any user through a web browser, for creating and modifying a database. The illustration shows a web browser window 200 containing a listing of available databases and tables 205. The listing of available databases and tables 205 contains a "New Database" button 210 for creating a new database, and a list of each existing database. An existing "Todo List" database 215 is shown. The "Todo List" database 215 contains a "Change" button 220 for modifying the database, and a listing of tables 225 in the database. The table listing 225 contains a "Create New Table" button 230 for creating a new table, and a list of each existing table. An existing table "My Todo List" 235 is shown. The table "My Todo List" 235 contains a "Change" button 240 for making changes to the table, and a list of web pages for accessing the table. The list of web pages contains a "Create New Web Page" button 245 for creating additional pages, and a list of two existing web pages. The first web page 250, called "All of My Todo's," contains a "Change" button 255 for making modifications to the web page. The second web page 260, called "Expensive Todo's," also contains a "Change" button 265 for making modifications to the web page.

Figure 3:
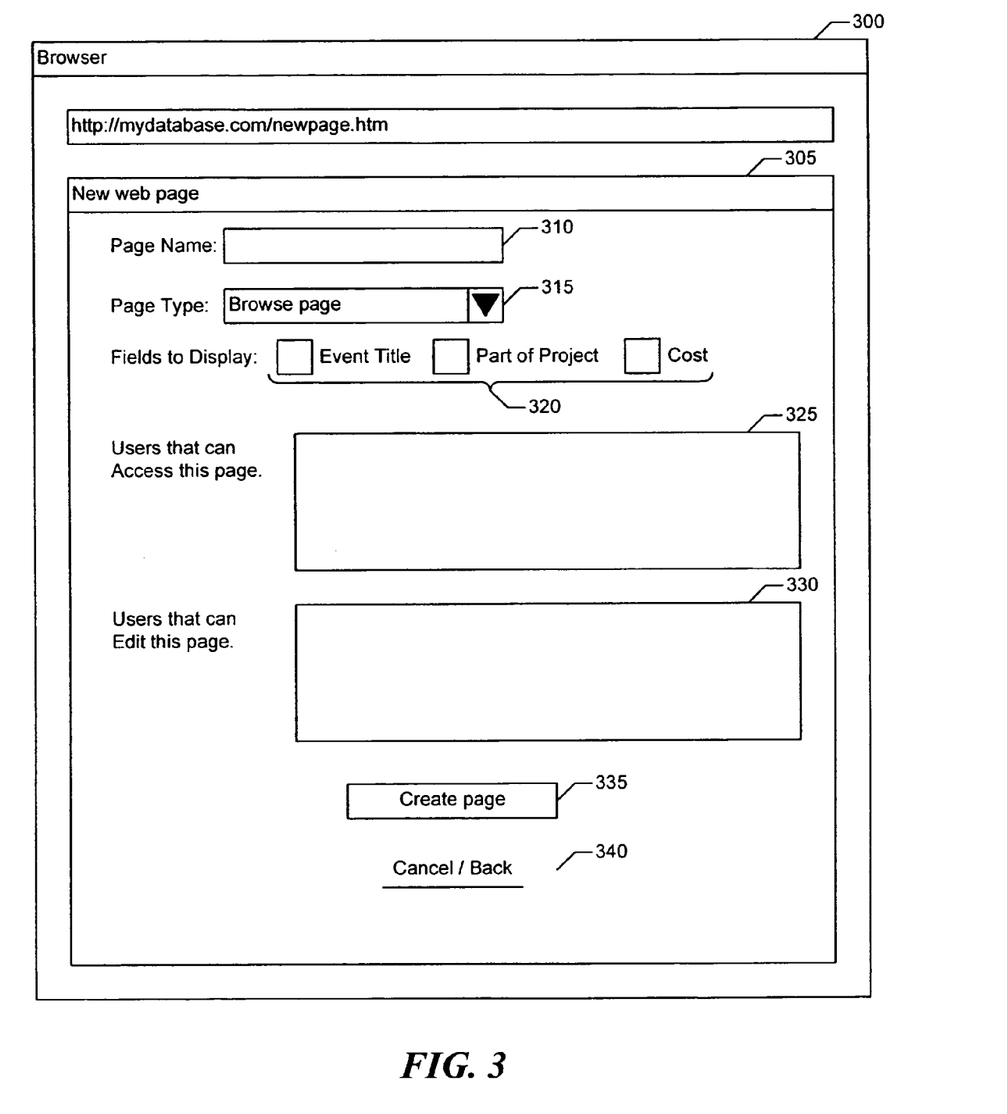
FIG. 3 illustrates a display page of the user interface of the system in one embodiment.

FIG. 3 illustrates a display page of the user interface of the system in one embodiment. The illustration shows an example of a user-friendly interface, available to any user through a web browser, for creating web pages to access a database. The illustration shows a web browser window 300 containing a dialog for creating a web page 305. The dialog 305 contains a name entry field 310, a page type field 315, a display field selection area 320, a list of users 325 to be granted access to view the web page, a list of users 330 to be granted access to edit the web page, a create page button 335, and a cancel button 340. The name entry field 310 receives input from the user specifying the name for the web page. The page type field 315 receives input specifying the type of page to create such as browse, search, or data entry. The display field selection area 320 specifies fields from the database to be displayed on the new web page. The list of users 325 lists the users to be granted access to view the web page. The list of users 330 lists the users to be granted access to edit the web page. The create page button 335 causes the page to be created with the specifications input by the user of the dialog 305. The cancel button 340 allows the user to discard the web page specification and go back to the previous screen.

Figure 4A:
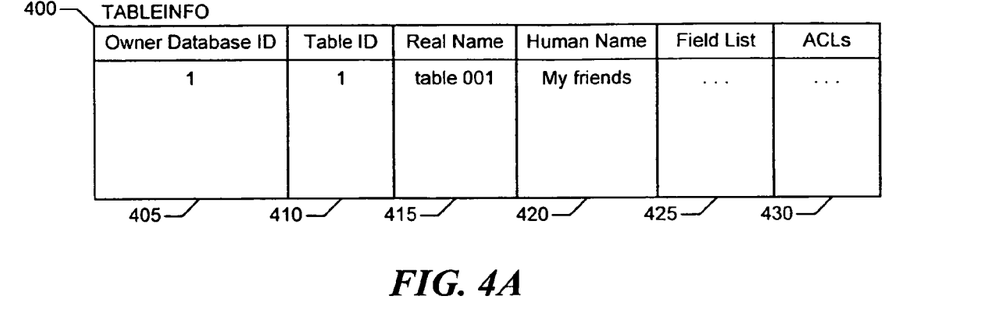
FIGS. 4A, 4B, and 4C illustrate three tables used to implement the database management system in one embodiment.
Figure 4B:
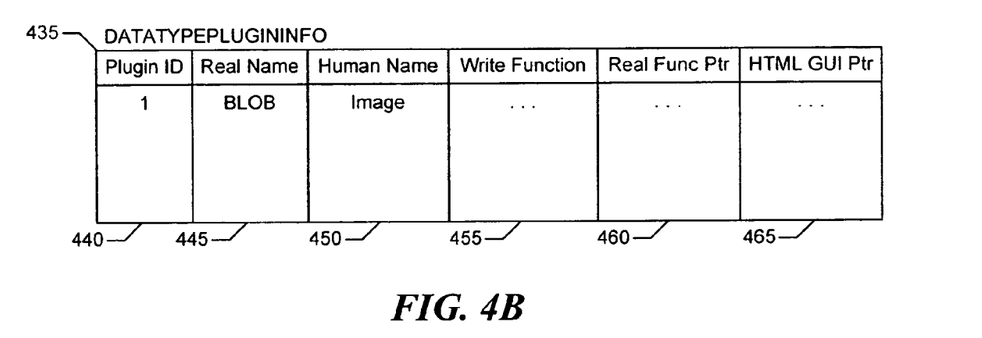
Figure 4C:
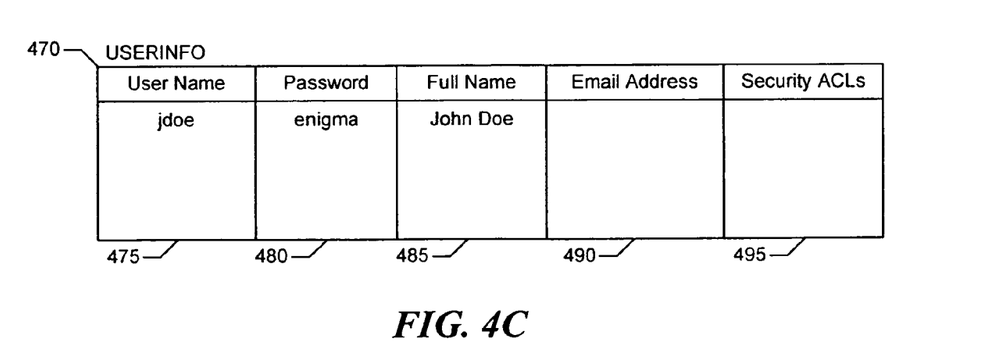

FIGS. 4A, 4B, and 4C illustrate three tables used to implement the database management system in one embodiment. The TABLEINFO table 400 contains columns OwnerDatabaseID 405, TableID 410, RealName 415, HumanName 420, FieldList 425, and ACLs 430. The TABLEINFO table 400 is used to store a listing of all of the tables that make up each database. The OwnerDatabaseID column 405 specifies the identifier of the database that a table belongs to. The TableID column 410 specifies the identifier of the table in a given entry. The RealName column 415 contains the name of the table in the underlying database, such as Table001. The HumanName column 420 contains the name of the table as entered by the user, such as "My Todo List." The FieldList column 425 contains a list of fields in the table. The FieldList column 425 may contain both the names of the fields in the underlying database and the names of the fields chosen by the user as well as information to map the user-selected type to the native types of the underlying database. The ACLs column 430 specifies which users have access to view, modify, delete, and perform other operations on the table.

The DATATYPEPLUGININFO table 435 contains columns PluginID 440, RealName 445, HumanName 450, WriteFuncPtr 455, ReadFuncPtr 460, and HTMLGUIPtr 465. The DATATYPEPLUGININFO table 435 is used to store a list of the plug-ins available for expanding data types handled by the database management system. The PluginID column 440 contains a unique identifier for the plug-in. The RealName column 445 contains the name of the data type used internally by the database management system to represent the type provided by the plug-in in the underlying database. The HumanName column 450 contains the name of the type that the plug-in provides that is presented to the user.

The WriteFuncPtr column 455 contains a pointer to the function in the plug-in used to handle a write operation for a field of the custom data type. The ReadFuncPtr column 460 contains a pointer to the function in the plug-in used to handle a read operation for a field of the custom data type. The HTMLGUIPtr column 465 contains a pointer to the function in the plug-in used to handle a request for Hypertext Markup Language (HTML) or other rendering information for a field of the custom data type.

The USERINFO table 470 contains columns Username 475, Password 480, FullName 485, EmailAddress 490, and SecurityACLs 495. The USERINFO table 470 is used to store a list of users authorized to interact with the database. The Username column 475 contains a name used to identify the user. The Password column 480 contains a password provided by the user to prove their identity. The FullName column 485 contains the full name of the user. The EmailAddress column 490 contains an email address to contact the user. The SecurityACLs column 495 specifies access control information for the user, such as which databases the user is permitted to access.

Figure 5:
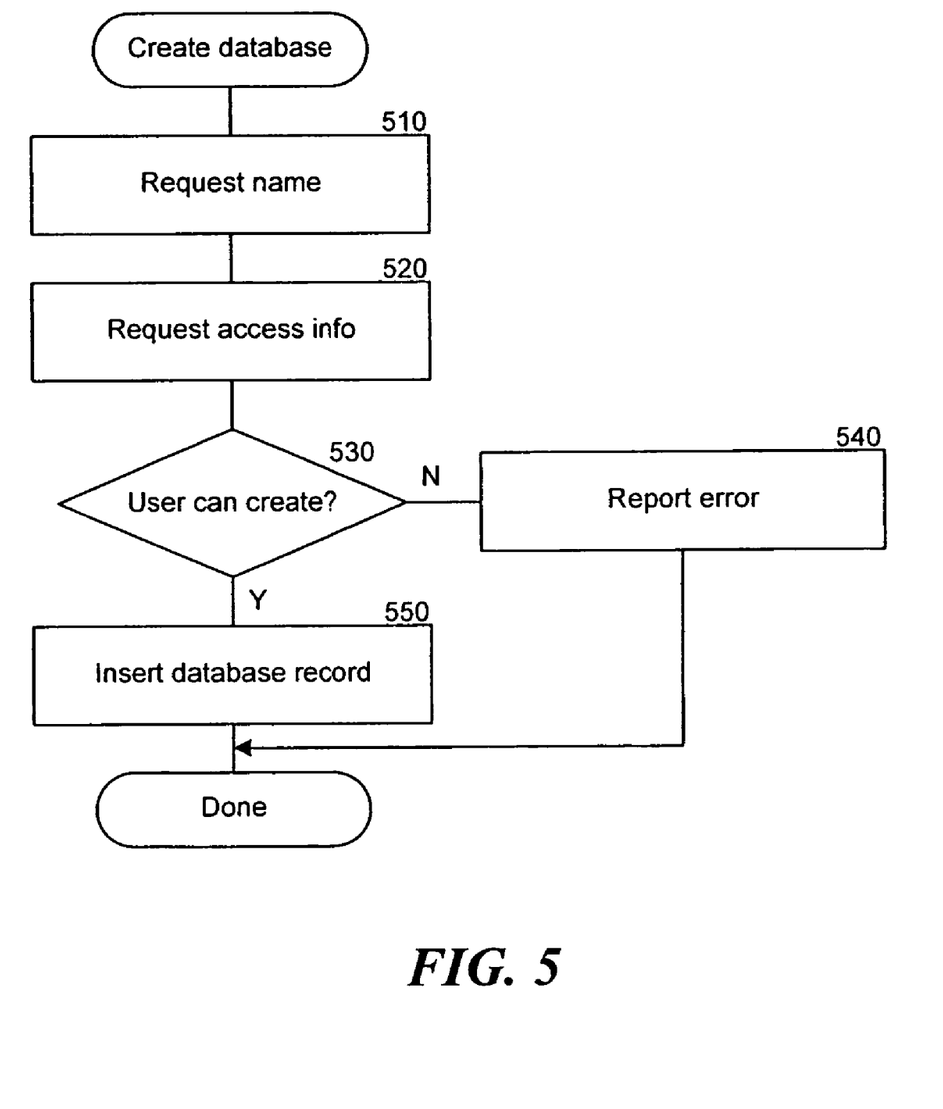
FIG. 5 is a flow diagram that illustrates the processing of the create database component of the system in one embodiment.

FIG. 5 is a flow diagram that illustrates the processing of the create database component of the system in one embodiment. The component is invoked when a user wants to create a new database. In block 510, the component requests a name for the new database from the user. In block 520, the component requests access information from the user. The component may also request additional information used to specify the database that the user wants to create, such as a selection of a database template to base the new database on. In decision block 530, if the user has been granted access to create the database, then the component continues at block 550, else the component continues at block 540 and reports an access error to the user. In block 550, the component inserts the new database record in the underlying database, and performs any other creation steps such as creating tables specified by a template. The component then completes.

Figure 6:
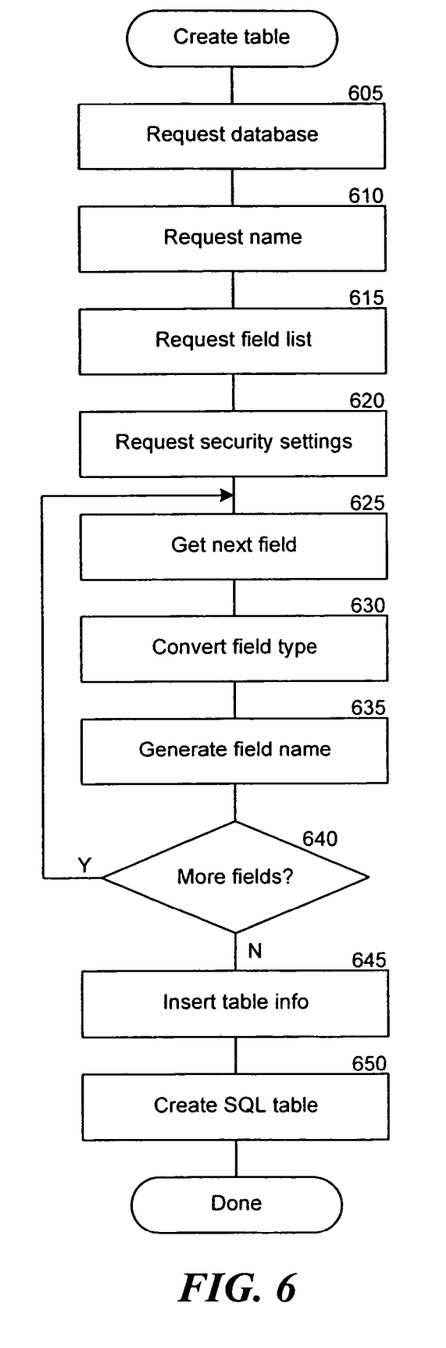
FIG. 6 is a flow diagram that illustrates the processing of the create table component of the system in one embodiment.

FIG. 6 is a flow diagram that illustrates the processing of the create table component of the system in one embodiment. The component is invoked when a user wants to create a new table in a database. In block 605, the component requests that the user select the database to add the table to. In block 610, the component requests a name for the table from the user. In block 615, the component requests a list of fields to be created in the new table. In block 620, the component requests access information, such as a list of users allowed to edit data in the table. In block 625, the component gets the next field entered by the user. In block 630, the component selects a native data type supported by the underlying database to contain the field. In block 635, the component generates a name compatible with the underlying database for the field. In decision block 640, if there are more fields specified by the user, then the component loops to block 625 to select the next field, else the component continues at block 645. In block 645, the component inserts information about the new table into the database management system (e.g., using the TABLEINFO table described above). In block 650, the component creates the table in the underlying database using SQL or other commands used to access the underlying database. The component then completes.

Figure 7:
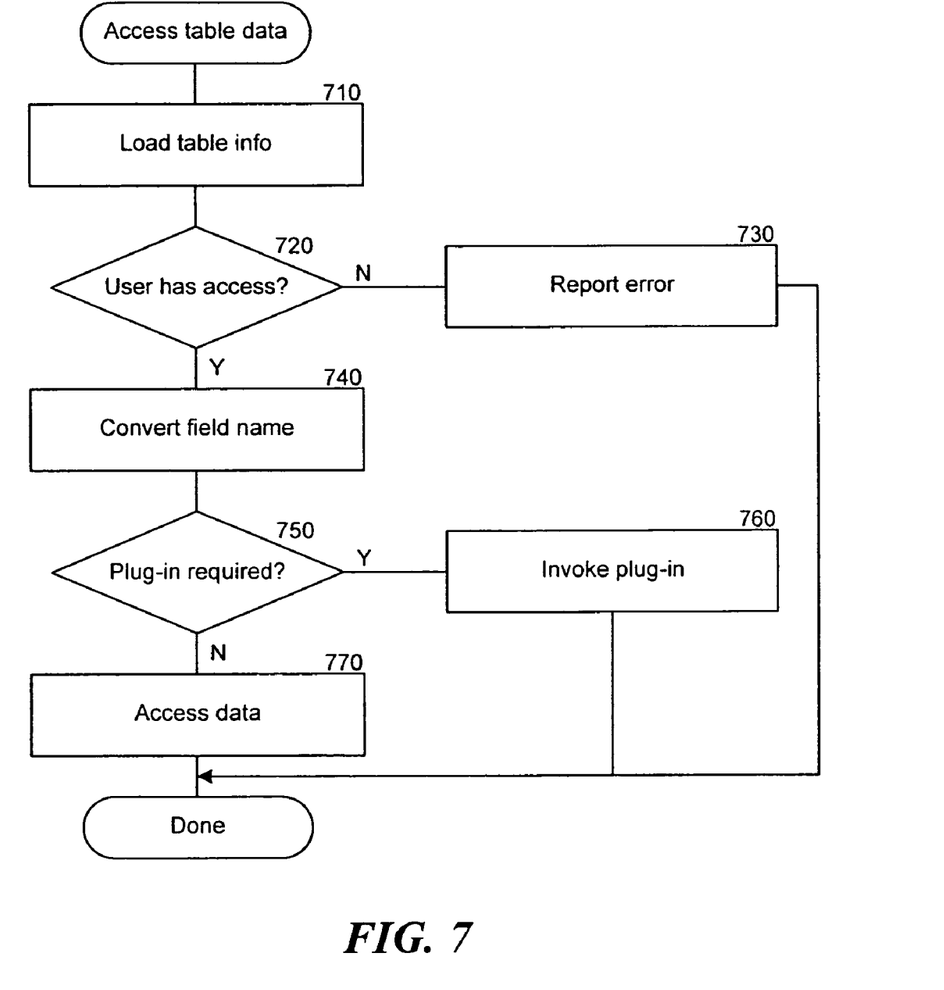
FIG. 7 is a flow diagram that illustrates the processing of the data access component of the system in one embodiment.

FIG. 7 is a flow diagram that illustrates the processing of the data access component of the system in one embodiment. The component is invoked when a user attempts to access data stored in a database. In block 710, the component loads information about each of the tables in the database. This information may be cached so that table information is only loaded following the first request for table data. In decision block 720, if the user has been granted access to access data in the database, then the component continues at block 740, else the component continues at block 730 and reports an access error to the user. In block 740, the component converts the field name specified by the user to the field name of the underlying database corresponding to the requested field using the table information. In decision block 750, if the requested field has a type that requires the support of a plug-in, then the component continues at block 760, else the component continues at block 770. In block 760, the appropriate plug-in is loaded and invoked to access the custom field data. In block 770, the data is accessed directly. The component then returns the requested information to the user and completes.

Figure 8:
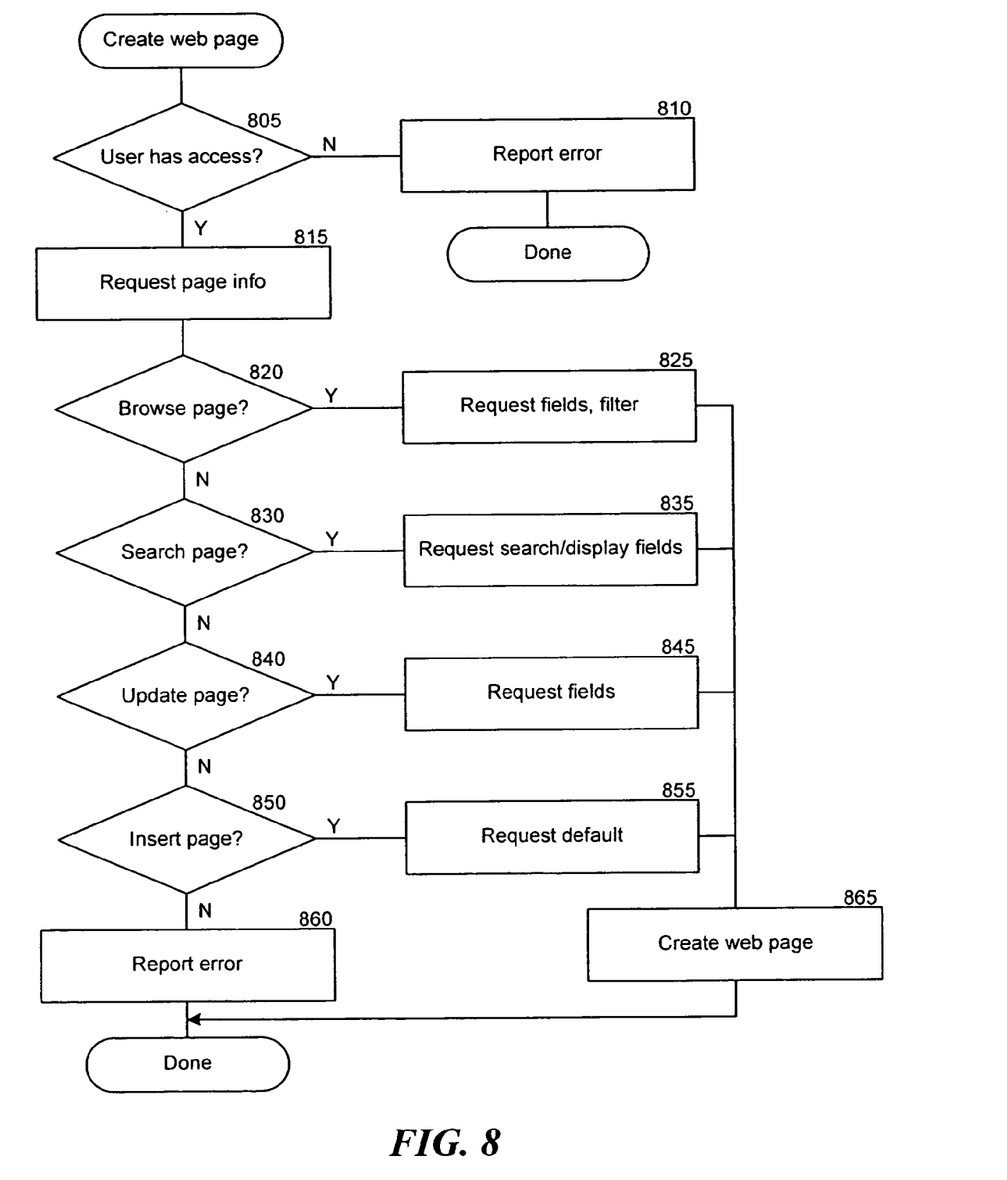
FIG. 8 is a flow diagram that illustrates the processing of the create web page component of the system in one embodiment.

FIG. 8 is a flow diagram that illustrates the processing of the create web page component of the system in one embodiment. The component is invoked when a user wants to create a new web page to access a database. In decision block 805, if the user has been granted access to create web pages to access the database, then the component continues at block 815, else the component continues at block 810 and reports an access error to the user. In block 815, the component requests information for specifying the layout of the web page from the user. In decision block 820, if the user selected a browse web page, then the component continues at block 825, else the component continues at block 830. In block 825, the component requests additional information for a browse web page such as the fields to be displayed and any filter to be applied. In decision block 830, if the user selected a search web page, then the component continues at block 835, else the component continues at block 840. In block 835, the component requests additional information for a search web page such as the fields to be displayed for search results and the fields to search. In decision block 840, if the user selected an update web page, then the component continues at block 845, else the component continues at block 850. In block 845, the component requests additional information for an update web page such as the fields to be updated and the users allowed to update the fields. In decision block 850, if the user requested an insert web page, then the component continues at block 855, else the component continues at block 860 and reports an unknown type error. In block 855, the component requests additional information for an insert web page, such as default values for new fields. In block 865, the component uses the specified information to create the web page. The component then completes.

From the foregoing, it will be appreciated that specific embodiments of the database management system have been described herein for purposes of illustration, but that various modifications may be made without deviating from the spirit and scope of the invention. For example, although web-based access of a database has been described, other forms of access may be used such as through a custom client application created using many popular programming packages that provide ease-of-use benefits similar to the web (e.g., Visual Basic, Delphi, and NET). The system has also been described in terms of a single database server, but multiple servers could be used. The database, database abstraction layer, and web access layer may reside on the same machine or on several separate machines. The database may be a full-fledged commercial database such as MySQL or Oracle or could be implemented as a simple flat file or other similar data storage and retrieval mechanism. Accordingly, the invention is not limited except as by the appended claims.

We claim:

1. A computing device for creating a database comprising:
a database system having native data types and a native naming syntax;

a database abstraction component for
  receiving a request to create a table of the database, the request specifying a user-defined field with a data type that is not a native data type and a user-defined field name that does not comply with the native naming syntax; and
  creating a table of the database with an actual field corresponding to the user-defined field, the actual field having a native data type and an actual field name that complies with the native naming syntax;
a user interface component for receiving from a user the request to create tables of the database through the database abstraction component; and
a web page creation component for generating browse, update, and search web pages that use the abstraction component to view and manipulate data of a created table of the database using a data type that is not a native data type and a name that does not comply with the native naming syntax.

2. The system of claim 1 wherein the native naming syntax limits the length of field names.

3. The system of claim 1 wherein the native naming syntax limits permissible characters of field names.

4. The system of claim 1 wherein the database abstraction component allows renaming fields without rebuilding the database.

5. The system of claim 1 wherein the database abstraction component uses a native data type to store a data type that is not a native data type, and chooses the native data type automatically.

6. The system of claim 1 wherein the database abstraction component automatically chooses which fields to index.

7. The system of claim 1 wherein the user interface component prompts a user for the strategy to use to overcome limitations of the database system.

8. The system of claim 1 wherein the database abstraction component controls which users have access to perform operations against the database.

9. The system of claim 1 wherein the database abstraction component allows the creation of fields only accessible by a particular user in a table accessible by multiple users.

10. The system of claim 1 wherein the user interface component provides templates for creating the database.

11. The system of claim 1 wherein the database abstraction component allows searches that span multiple tables.

12. The system of claim 1 wherein the database abstraction component uses SQL to communicate with the database system.

13. The system of claim 1 where the database abstraction component supports a plug-in that expands the capabilities of the system.

14. The system of claim 13 wherein the plug-in adds support for an additional data type to the system.

15. The system of claim 13 wherein the plug-in adds support for an additional method of processing data to the system.

16. The system of claim 1 where in the database abstraction component exposes an externally accessible API for interacting with the database system.

17. The system of claim 1 wherein the user interface component is web-based.

18. A method performed by a computing device for creating and accessing tables of a database system, the database system having native data types and a native naming syntax, the method comprising:
  receiving an indication to create a user-defined table having a user-defined field with a non-native data type and with a user-defined field name that does not comply with the native naming syntax;
  creating an actual table of the database system that corresponds to the user-defined table, the actual table having an actual field with a native data type and with an actual field name that complies with the native naming syntax;
  generating by the computing device mappings between the user-defined table and the actual table and between the user-defined field and the actual field that specifies the user-defined data type and the user-defined name;
  receiving a request to add a row to the user-defined table, the request specifying a value of the non-native data type and the user-defined field name;
  adding a row to the actual table is mapped to the user-define table of the request, the row including an actual field with an actual field name that is mapped to the user-defined field name of the request set to a value of the native data type corresponding to the value of the non-native data type of the request; and
  in response to receiving a request to retrieve the added row,
    retrieving the added row from the actual table; and
    returning the retrieved row that specifies a field with the user-defined field name and with the value of the non-native data type that was specified in the request to add the row.

19. The method of claim 18 including creating web pages through which the request to add a row is received, the request to retrieve the added row is received, and the retrieved row is returned.

20. The method of claim 19 wherein the native naming syntax limits the length of field names.

21. The method of claim 19 wherein the native naming syntax limits the characters that can be used in field names.

22. The method of claim 19 wherein before creating the actual table, automatically selecting an actual field to index.

23. The method of claim 19 wherein the database system is a SQL database system.

24. A computer-readable storage medium containing computer-executable instructions for controlling a computing device to create and access tables of a database system, the database system having a native naming syntax, by a method comprising:
  receiving an indication to create a user-defined table having a user-defined field with a user-defined field name that does not comply with the native naming syntax;
  creating an actual table of the database system that corresponds to the user-defined table, the actual table having an actual field with an actual field name that complies with the native naming syntax;
  generating by the computing device mappings between the user-defined table and the actual table and between the user-defined field and the actual field that specifies the user-defined field name;
  receiving a retrieve request to retrieve data from the user-defined table;
  in response to receiving the retrieve request,
    retrieving a row from the actual table, the actual table being identified based on the mapping of the user-defined table to the actual table; and returning data of the retrieved row that specifies the user-defined field name as the field name for the user-defined field based on the mapping of the user-defined field name to the actual field name.

25. The computer-readable storage medium of claim 24 further including:

receiving an add request to add a row to the user-defined table, the request specifying the user-defined field name;

adding a row to the actual table is mapped to the user-defined table of the add request, the row including an actual field with an actual field name that is mapped to the user-defined field name of the request.

26. The computer-readable storage medium of claim 25 including creating web pages through which the add request is received, the retrieve request is received, and the data of the retrieved row is returned.

27. The computer-readable storage medium of claim 24 wherein the native naming syntax limits length of field names.

28. The computer-readable storage medium of claim 24 wherein the native naming syntax limits characters that can be used in field names.

29. The method of claim 19 wherein the database system is a SQL database system.

* * * * *

UNITED STATES PATENT AND TRADEMARK OFFICE
CERTIFICATE OF CORRECTION

PATENT NO. : 7,650,335 B2
APPLICATION NO. : 11/407685
DATED : January 19, 2010
INVENTOR(S) : Kalev Leetaru et al.

It is certified that error appears in the above-identified patent and that said Letters Patent is hereby corrected as shown below:

In column 10, line 55, delete "NET)." and insert -- .NET). --, therefor.

In column 12, line 20, in claim 18, delete "user-define" and insert -- user-defined --, therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,650,335 B2
APPLICATION NO. : 11/407685
DATED : January 19, 2010
INVENTOR(S) : Leetaru et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 347 days.

Signed and Sealed this

Twenty-eighth Day of December, 2010

David J. Kappos
*Director of the United States Patent and Trademark Office*